(12) United States Patent
Canale

(10) Patent No.: US 12,561,915 B1
(45) Date of Patent: Feb. 24, 2026

(54) SYSTEMS AND METHODS FOR CREATING CUSTOMIZED VIRTUAL REALITY ENVIRONMENT

(71) Applicant: Cosmo Michael Canale, Bronx, NY (US)

(72) Inventor: Cosmo Michael Canale, Bronx, NY (US)

(73) Assignee: SLS Holdings, LLC, Scarsdale, NY (US)

( * ) Notice: Subject to any disclaimer, the term of this patent is extended or adjusted under 35 U.S.C. 154(b) by 104 days.

(21) Appl. No.: 18/532,772

(22) Filed: Dec. 7, 2023

Related U.S. Application Data

(60) Provisional application No. 63/525,829, filed on Jul. 10, 2023.

(51) Int. Cl.
*G06T 19/00* (2011.01)
*G06F 3/16* (2006.01)
*G06T 15/00* (2011.01)

(52) U.S. Cl.
CPC .............. *G06T 19/00* (2013.01); *G06F 3/165* (2013.01); *G06T 15/00* (2013.01); *G06T 2200/24* (2013.01); *G06T 2219/024* (2013.01)

(58) Field of Classification Search
CPC ....... G06T 19/00; G06T 19/003; G06T 19/20; G06T 15/00; G06T 15/005; G06T 15/20; G06T 15/205; G06T 2200/24; G06T 2219/024; G06F 3/165
See application file for complete search history.

(56) References Cited

U.S. PATENT DOCUMENTS

| | | | |
|---|---|---|---|
| 8,429,245 B2 | 4/2013 | Edecker et al. | |
| 8,924,880 B2 | 12/2014 | Altberg et al. | |
| 10,657,701 B2 * | 5/2020 | Osman ................... | A63F 13/25 |
| 11,257,266 B2 | 2/2022 | Du | |
| 11,893,558 B2 * | 2/2024 | Siddique ................ | G06T 19/00 |
| 12,097,332 B2 * | 9/2024 | Krishnan ............... | G16H 20/30 |
| 2017/0140484 A1 | 5/2017 | Lete et al. | |
| 2018/0350406 A1 | 12/2018 | Lodato et al. | |
| 2019/0362545 A1 | 11/2019 | Pejic et al. | |
| 2020/0273092 A1 | 8/2020 | Wilson et al. | |
| 2023/0012960 A1 * | 1/2023 | Krishnan ............... | A61B 5/486 |
| 2023/0139626 A1 * | 5/2023 | Berliner ................. | G06F 1/163 345/156 |
| 2025/0086915 A1 * | 3/2025 | Filip ..................... | G06T 19/006 |

FOREIGN PATENT DOCUMENTS

JP          2019532385 A      11/2019

* cited by examiner

*Primary Examiner* — Vijay Shankar
(74) *Attorney, Agent, or Firm* — John Rizvi; John Rizvi, P.A.—The Patent Professor®

(57) ABSTRACT

Systems, devices, and methods for creating customized virtual reality environment are disclosed. A first user input is received from a user device. The first user input is associated with a selection of a virtual reality environment from a set of virtual reality environments. A second user input is received from the user device. The second user input is associated with a set of customization options for the selected virtual reality environment. A customized virtual reality environment is generated based on the second user input. The generated virtual reality environment is rendered on virtual reality terminal associated with the user. Further, one or more other users are enabled to join the user and communicate with the user within the customized virtual reality environment.

15 Claims, 8 Drawing Sheets

200

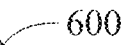

RECEIVE, FROM A USER DEVICE, A FIRST USER INPUT ASSOCIATED WITH A SELECTION OF VIRTUAL REALITY ENVIRONMENT FROM A SET OF VIRTUAL REALITY ENVIRONMENTS    <u>602</u>

RECEIVE, FROM THE USER DEVICE, A SECOND USER INPUT ASSOCIATED WITH SET OF CUSTOMIZATION OPTIONS FOR THE SELECTED VIRTUAL REALITY ENVIRONMENT    <u>604</u>

GENERATE A CUSTOMIZED VIRTUAL REALITY ENVIRONMENT BASED ON RECEPTION OF THE SECOND USER INPUT    <u>606</u>

RENDER THE CUSTOMIZED VIRTUAL REALITY ENVIRONMENT ON A VIRTUAL REALITY TERMINAL ASSOCIATED WITH A USER    <u>608</u>

FIG. 6

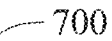

RECEIVE, FROM A FIRST USER DEVICE, A FIRST USER INPUT ASSOCIATED WITH A SELECTION OF VIRTUAL REALITY ENVIRONMENT FROM A SET OF VIRTUAL REALITY ENVIRONMENTS        702

RECEIVE, FROM THE FIRST USER DEVICE, A SECOND USER INPUT ASSOCIATED WITH A SET OF CUSTOMIZATION OPTIONS FOR THE SELECTED VIRTUAL REALITY ENVIRONMENT        704

GENERATE A CUSTOMIZED VIRTUAL REALITY ENVIRONMENT BASED ON RECEPTION OF THE SECOND USER INPUT        706

RENDER THE CUSTOMIZED VIRTUAL REALITY ENVIRONMENT ON A FIRST VIRTUAL REALITY TERMINAL ASSOCIATED WITH A FIRST USER        708

RECEIVE, FROM A SECOND USER DEVICE ASSOCIATED WITH A SECOND USER, A REQUEST TO JOIN THE CUSTOMIZED VIRTUAL REALITY ENVIRONMENT        710

RENDER, ON A SECOND VIRTUAL REALITY TERMINAL ASSOCIATED WITH THE SECOND USER, THE CUSTOMIZED VIRTUAL REALITY ENVIRONMENT TO BE VIEWED BY SECOND USER; WHEREIN THE FIRST USER AND THE SECOND USER ARE ENABLED TO COMMUNICATE WITH EACH OTHER WITHIN THE VIRTUAL REALITY ENVIRONMENT USING A FIRST AVATAR ASSOCIATED WITH THE FIRST USER AND A SECOND AVATAR ASSOCIATED WITH SECOND USER        712

FIG. 7

SYSTEMS AND METHODS FOR CREATING CUSTOMIZED VIRTUAL REALITY ENVIRONMENT

CROSS-REFERENCE TO RELATED APPLICATIONS

This application claims the benefit of U.S. Provisional Patent Application Ser. No. 63/525,829 filed on Jul. 10, 2023, which is incorporated by reference herein in its entirety.

FIELD OF THE INVENTION

The present disclosure relates generally to virtual reality environments, and more particularly, to systems and methods for creating a customized virtual reality environment.

BACKGROUND OF THE INVENTION

With the recent advancements in the field of computer graphics and computer simulation, many new immersive technologies such as augmented reality (AR), virtual reality (VR), mixed reality (MR), and extended reality (XR) have emerged and are being used in a variety of applications such as, but not limited to, entertainment, education, gaming, marketing, tourism, and the like. AR is a technology that superimposes computer-generated elements such as images, sounds, and texts, onto the real world, enhancing or augmenting the experience of an end user.

VR is a simulated three-dimensional environment that enables the end user to explore and interact with a virtual surrounding in a way that approximates reality, as it is perceived through the end user's senses. MR is essentially a hybrid of VR and AR. It involves the use of technology to create interactive VR environments that can interact with the real world. XR is a more encompassing term that includes all immersive technologies. In addition to MR, XR also includes AR and VR. However, in case of VR, the simulated three-dimensional environment is already created by the creators of the applications and may not be customized according to the preferences of the end user. For example, in use-case scenarios, where the VR environments are used for stress releasing or stress-relief applications, generic VR environment experienced by the end-user may not help the end-user in stress reduction. Simply stated, each end user may respond to a different stress-release stimuli, which may not be present in generic VR environments.

Accordingly, there is need for a solution to at least one of the aforementioned problems. For instance, there is an established need for a system for creating simulated three-dimensional environment according to the preferences of the end user.

SUMMARY OF THE INVENTION

In an aspect, the present disclosure relates to a computer-implemented method for creating a customized virtual reality environment. The method includes receiving, by a virtual reality engine, from a user device, a first user input associated with a selection of a virtual reality environment from a set of virtual reality environments from a user device. The method further includes receiving, by the virtual reality engine, from the user device, a second user input associated with a set of customization options for the selected virtual reality environment based on the received first user input. The set of customizations may include at least one of a weather within the virtual reality environment, a timestamp associated with the virtual reality environment, and a media to be rendered within the virtual reality environment. The method further includes generating, by the virtual reality engine, a customized virtual reality environment based on the second user input. The method further includes rendering, by the virtual reality engine, the customized virtual reality environment on a virtual reality terminal associated with the user.

In an aspect, the user device may be a first user device, the user may be a first user, and the method may further include: receiving, by the virtual reality engine, from a second user device associated with a second user, a request to join the customized virtual reality environment; and in response to the request, rendering, by the virtual reality engine, on a virtual reality terminal associated with the second user, the customized virtual reality environment.

In an aspect, the method may further include enabling, by the virtual reality engine, the first user and the second user to communicate with each other within the customized virtual reality environment using a first avatar and a second avatar, the first avatar being associated with the first user, and the second avatar being associated with the second user.

In an aspect, the method may further include receiving, by the virtual reality engine, data indicative of one or more physiological parameters of the user; processing, by the virtual reality engine, the data indicative of the one or more physiological parameters of the user; and generating, by the virtual reality engine, based on processing, one or more virtual reality environment customization recommendations for the user.

In an aspect, the virtual reality engine may be an artificial intelligence (AI)-enabled engine, and the method may further include: employing, by the virtual reality engine, AI functionality to process user information, wherein the user information comprises one or more of physiological parameters of the user, user history, and user behavior, and wherein the customized virtual reality environment may be further generated and rendered based on the processed user information.

In an aspect, receiving the second user input may include receiving a user input indicative of user-selected weather for the selected virtual reality environment.

In an aspect, receiving the second user input may include receiving a user input indicative of user-selected time of day for the selected virtual reality environment.

In an aspect, receiving the second user input may include receiving a user input indicative of user-selected audio media for the selected virtual reality environment.

In an aspect, receiving the second user input may include receiving a set of user inputs, the set of user inputs comprising a selection of weather, a selection of a time of day, and a selection of audio media, for the selected virtual reality environment, the weather being selected from a sunny weather, a cloudy weather, a rainy weather, a snowy weather, a stormy weather, a windy weather, and a foggy weather, and the time of day being selected from morning, afternoon, evening, and night.

In yet another aspect, the present disclosure relates to a virtual reality engine, comprising: a processor; and a memory coupled to the processor, the memory comprises processor-executable instructions, which when executed by the processor, cause the processor to perform or control performance of operations that comprise: receive, from a user device associated with a user, a first user input associated with selection of a virtual reality environment from a set of virtual reality environments; receive, from the user device, a second user input associated with a set of customization options for the selected virtual reality environment, wherein the set of customization options comprises at least one of: a weather within the virtual reality environment, a timestamp associated with the virtual reality environment, and a media to be rendered within the virtual reality environment; generate a customized virtual reality environment based on the second user input, and render, on a virtual reality terminal associated with the user, the customized virtual reality environment.

In yet another aspect, the present disclosure relates to a method for creating a customized virtual reality environment. The method includes receiving, by a processor, from a first user device associated with a first user, a set of user inputs associated with a set of customization options for a virtual reality environment. The set of customization options includes at least one of a scene type of the virtual reality environment, a weather associated with the virtual reality environment, a timestamp associated with the virtual reality environment, and a media to be rendered within the virtual reality environment. The method includes creating, by the processor, the virtual reality environment based on the received set of user inputs associated with the set of customization options for the virtual reality environment. The method further includes rendering, by the processor, the created virtual reality environment on a first virtual reality terminal associated with the first user device and to be viewed by the first user. The method further includes receiving, by the processor, from a second user device associated with a second user, a request to join the created virtual reality environment. The method further includes rendering, by the processor, the virtual reality environment on a second virtual reality terminal associated with the second user device and to be viewed by the second user. The first user and the second user communicate with each other within the virtual reality environment using a first avatar associated with the first user and a second avatar associated with the second user, and a stress level of each of the first user and the second user is reduced based on viewing the virtual reality environment.

In another aspect, the present disclosure relates to a system including a processor and a memory operatively coupled to the processor. The memory includes processor-executable instructions, which when executed by the processor, cause the processor to perform the methods discussed herein.

In another aspect, the present disclosure relates to a virtual reality engine including a processor and a memory operatively coupled to the processor. The memory includes processor-executable instructions, which when executed by the processor, cause the processor to perform or control performance of operations of the methods disclosed herein.

In another aspect, the present disclosure relates to a non-transitory computer-readable storage medium comprising instructions executable by a processor, the instructions to cause the processor to carry out any of the methods disclosed herein.

These and other objects, features, and advantages of the present disclosure will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 6 shows a flow chart of an example method for creating a customized virtual reality environment, in accordance with embodiments of the present disclosure;

FIG. 7 shows a flow chart of an example method for creating a customized virtual reality environment and interacting within the customized virtual reality environment, in accordance with embodiments of the present disclosure.

Like reference numerals refer to like parts throughout the several views of the drawings.

DETAILED DESCRIPTION

Figure 1:
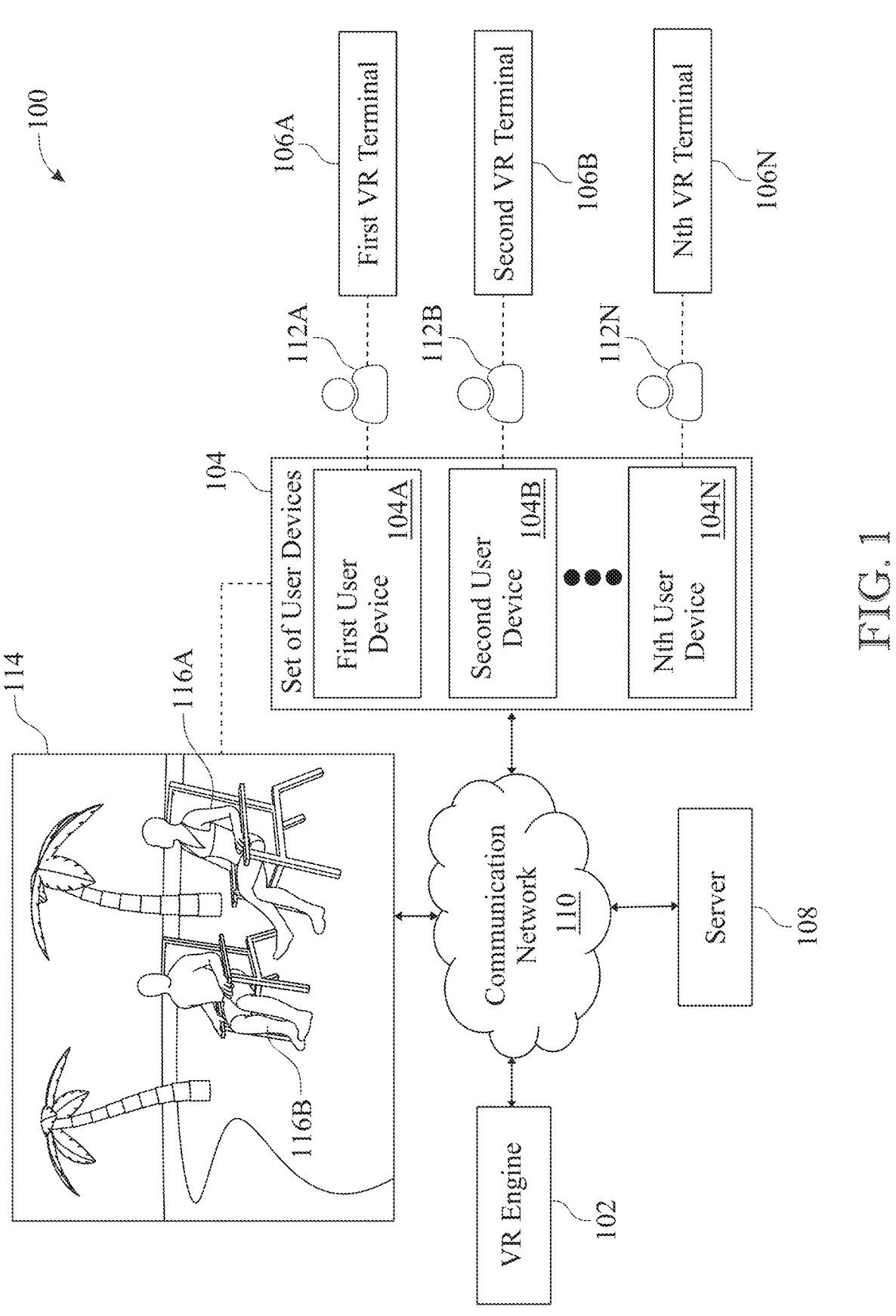
FIG. 1 shows an example networked environment with which or in which embodiments of the present disclosure may be implemented.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following description, certain specific details are set forth in order to provide a thorough understanding of various disclosed implementations. However, one skilled in the relevant art will recognize that implementations may be practiced without one or more of these specific details, or with other methods, components, materials, and the like.

Unless the context requires otherwise, throughout the specification and claims which follow, the word "comprise" and variations thereof, such as, "comprises" and "comprising" are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

The headings and Abstract of the Disclosure provided herein are for convenience only and do not interpret the scope or meaning of the implementations.

Shown throughout the figures, the present disclosure is directed towards methods and systems for creating a customized virtual reality environment.

The various embodiments throughout the disclosure will be explained in more detail with reference to FIGS. 1-8.

FIG. 1 shows an example networked environment 100, in accordance with some embodiments of the present disclosure.

With reference to FIG. 1, the networked environment 100 includes a virtual reality (VR) engine 102 that is communicatively coupled to a plurality of user devices (104A, 104B . . . 104N). and a plurality of VR terminals (106A, 106B . . . 106N). Each of the set of user devices (104A, 104B . . . 104N) and the set of VR terminals (106A, 106B . . . 106N) may be associated with a respective user (112A, 112B . . . 12N). Further, the networked environment 100 includes a server 108 communicatively coupled to the VR engine 102 via a communication network 110. In some embodiments, the networked environment 100 includes a customized virtual reality environment 114, which includes a first avatar 116A and a second avatar 116B. It may be appreciated that the user devices (104A, 104B . . . 104N) may be individually referred as the user device 104 and collectively referred as the user devices 104, the VR terminals (106A, 106B . . . 106N) may be individually referred as the VR terminal 106 and collectively referred as the VR terminals 106, and the users (112A, 112B . . . 112N) may be individually referred as the user 112 and collectively referred as the users 112.

In some embodiments, the VR engine 102 may include suitable logic, circuitry, interfaces, and/or code that may be configured to create a customized virtual reality environment 114. The VR engine 102 may be configured to receive a first user input associated with a selection of a virtual reality environment from a set of virtual reality environments from a first user device 104A associated with a first user 112A. The VR engine 102 may be configured to receive a second user input associated with a set of customization options for the selected virtual reality environment. The second input may be received based on the received first user input. The VR engine 102 may be configured to create the customized virtual reality environment 114 based on the reception of the second user input. The VR engine 102 may further render the customized virtual reality environment 114 on the first VR terminal 106A associated with the first user device 104A.

In some embodiments, the user device 104 may include a digital platform communicatively coupled with the VR engine 102. In some embodiments, the digital platform may be a mobile application. The mobile application may be installed on the user device 104. In some embodiments, the digital platform may be a web application (e.g., a website or a webpage). In some embodiments, the digital platform may be a desktop application. The digital platform in conjunction with a processing unit may render a graphical user interface on the user device 104 such that a user 112 of the user device 104 may communicate with the VR engine 102 via the graphical user interface rendered on the user device 104. The graphical user interface may be rendered on the user device 104 under control of the VR engine 102. In some embodiments, the digital platform may be hosted on the VR engine 102. In some embodiments, the user 112 may use the user device 104 to, but not limited to, send inputs to the VR engine 102, customize virtual reality environments, or the like.

In some embodiments, each user device of the plurality of user devices 104 may include suitable logic, circuitry, interfaces, and/or code that may be configured to provide the set of user inputs associated with the selection of a virtual reality environment and the set of customization options for the selected virtual reality environment. In some embodiments, each user device of the plurality of user devices 104 may be configured to render the customized virtual reality environment 114. Examples of the plurality of user devices 104 may include, but are not limited to, head-mounted display (HMD), a virtual reality glass, a computing device, a mainframe machine, a server, a computer work-station, a telephone, a smartphone, a cellular phone, a mobile phone, a personal digital assistant (PDA) device, a tablet, a gaming device, and/or a consumer electronic (CE) device.

A person of ordinary skill in the art will appreciate that each of the plurality of user devices 104 may not be restricted to the mentioned devices and various other devices may be used.

In some embodiments, the server 108 may comprise suitable logic, circuitry, interfaces, and code that may be configured to store the received set of user inputs. In some embodiments, the server 108 may be configured to store the created customized virtual reality environment 114. The server 108 may be implemented as a cloud server which may execute operations through web applications, cloud applications, hypertext transfer protocol (HTTP) requests, repository operations, file transfer, and the like. Other examples of the server 108 may include, but are not limited to, a database server, a file server, a web server, a media server, an application server, a mainframe server, a cloud server, or other types of servers. In some embodiments, the server 108 may be implemented as a plurality of distributed cloud-based resources by use of several technologies that are well known to those skilled in the art. A person with ordinary skill in the art will understand that the scope of the disclosure may not be limited to implementation of the server 108 and the VR engine 102 as separate entities. In certain embodiments, the functionalities of the server 108 may be incorporated in its entirety or at least partially in the VR engine 102, without departure from the scope of the disclosure.

Referring to FIG. 1, the communication network 110 may include a communication medium through which the VR engine 102, the plurality of user devices 104, the plurality of VR terminals 106, and the server 108 may communicate with each other. The communication network 110 may be a wired or wireless communication network. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the networked environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), HTTP, File Transfer Protocol (FTP), wireless access point (AP), device-to-device communication, cellular communication protocols, and Bluetooth (BT) communication protocols, or the like.

In some embodiments, the virtual reality environment 114 may include 360 degree content or three-dimensional (3D) virtual reality content, which may be accessed by the users 112 using VR terminal(s) 106. The VR terminal 106 may comprise any type of a device (e.g., head-mounted device) that enables a user 112 to experience virtual reality content such as images, video, audio, animation, games, or some combination thereof. In some examples, the VR terminal 106 may comprise a wearable device, and the like. In some examples, the VR terminal 106 may comprise a VR headset. In some examples, the VR terminal 106 may be provided by the VR engine 102 to the user 112 for the user 112 to experience VR content corresponding to VR environment 114. In some examples, the user 112 may be enabled by the VR engine 102 to rent or purchase the VR terminal 106 from the digital platform associated with the VR engine 106. For example, the user 112 may pay rent or purchase fees to the VR engine 102 to rent or purchase the VR terminal 106.

In some embodiments, the first user 112A may have an increased stress level and may wish to reduce their stress level. The VR engine 102 may be configured to receive the first user input associated with the selection of a virtual reality environment 114 from a set of virtual reality environments from the first user device 104A. Each virtual reality environment of the set of virtual reality environments may be a computer-generated simulation of a 3D environment that may allow the set of users 112 to feel as if they are physically present in that environment. The virtual reality environment 114 may be an immersive experience that may stimulate the senses of sight, sound, and touch to create an artificial world that appears realistic to the set of users 112. In some embodiments, prior to providing the set of VR environments, the VR engine 102 may enable the user 112 to create a user account associated with the user 112, for example, with the digital platform. In some implementations, a user interface may be presented on the user device 104 which may enable the user 112 to create the user account. Input fields to enter user credentials, such as "name," email," "phone number," "password," and "confirm password" may be provided as part of the user interface for the user 112 to create the user account. If the user 112 already has a user account, they can log-in into their account using an option to "Sign in." If the user 112 has a social media account, they can create the user account or log in using the social media account.

Furthermore, in some examples, after the user account is created for the user 112, the user 112 may be enabled by the VR engine 102 to choose a subscription plan to procure access to the one or more VR environments. In some implementations, the access to the one or more VR environments may be procured on a subscription plan basis such as for a fixed time period, for example, a day, month, a year, or the like.

In some examples, to purchase the subscription plan to procure access to the one or more VR environments, the user 112 may be enabled by the VR engine 102 to submit a payment. For example, a user interface may be presented on the user device 104, under control of the VR engine 102, which may enable the user 112 to submit the payment. In some examples, the VR engine 102 may interface with a payment gateway for users 112 to submit payment through their respective devices 104. The payment gateway may enable the users 112 to submit the payments using a debit card, credit card, internet banking, digital wallet, or mediums such as PayPal™ or the like. The payment gateway may securely collect user's payment information and then send it to a financial institution in order to perform the transaction.

After the payment confirmation, a notification may be sent by the VR engine 102 to a user device 104, the notification being indicative of the purchase being successful. In some examples, the notification may include a pop-up notification. In some examples, the notification may include a mobile push notification, which may be a visual, audio, or a haptic notification.

In some embodiments, in response to selection of a virtual reality environment, the first user 112A may wish to further customize the selected virtual reality environment 114. The VR engine 102 may be further configured to receive the second user input based on the received first user input. The second user input may be associated with a set of customization options for the selected virtual reality environment 114. The set of customization options may include, but not be limited to, a weather associated within the virtual reality environment 114, a timestamp associated with the virtual reality environment 114, and a media to be rendered within the virtual reality environment 114.

The VR engine 102 may be further configured to create the customized virtual reality environment 114. The customized virtual reality environment 114 may be created based on the reception of the second user input. The customized virtual reality environment 114 may correspond to the selected virtual reality environment that may be customized based on the set of customization options received in the second user input. The VR engine 102 may be further configured to render the created customized virtual reality environment 114 on a first VR terminal 106A associated with the first user device 104A or the first user 112.

In some embodiments, the VR engine 102 may be configured to receive a request to join the customized virtual reality environment 114. The request may be received from the second user device 104B that may be associated with the second user 112B. The VR engine 102 may be further configured to render the customized virtual reality environment 114 on a second VR terminal 106B that may be associated with the second user device 104B or the second user 112B. The created customized virtual reality environment 114 may be rendered on the second VR terminal 106B to be viewed by the second user 112B.

In an embodiment, the first user 112A and the second user 112B may communicate with each other within the customized virtual reality environment 114 using the first avatar 116A that may be associated with the first user 112A and the second avatar 116B that may be associated with the second user 112B. The first avatar 116A may correspond to a virtual representation of the first user 112A in the customized virtual reality environment 114. The first avatar 116A may be a computer-generated 3D model that may be customized to represent the first user 112A in the customized virtual reality environment 114. Similarly, the second avatar 116B may correspond to the virtual representation of the second user 112B in the customized virtual reality environment 114. The second avatar 116B may be the computer-generated 3D model that may be customized to represent the second user 112B in the customized virtual reality environment 114. In another embodiment, the stress level of the first user 112A and the second user 112B may be reduced after viewing the customized virtual reality environment 114.

Although FIG. 1 shows example components of the networked environment 100, in other embodiments, the networked environment 100 may include fewer components, different components, differently arranged components, or additional functional components than depicted in FIG. 1. Additionally, or alternatively, one or more components of the networked environment 100 may perform functions described as being performed by one or more other components of the networked environment 100.

Figure 2:
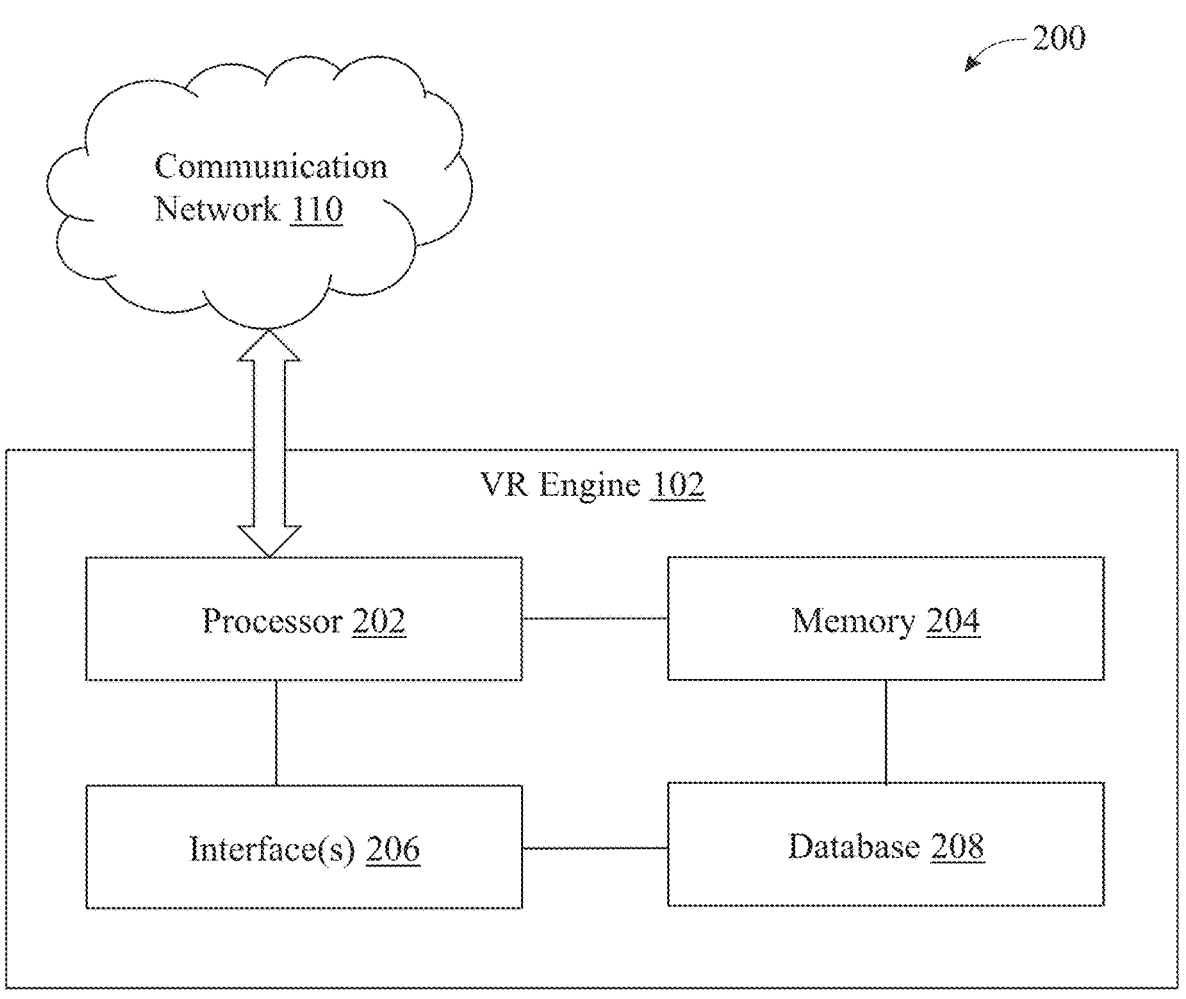
FIG. 2 shows a block diagram of an example virtual reality engine with which or in which embodiments of the present disclosure may be implemented.

FIG. 2 shows a block diagram 200 of an example VR engine 102 with which or in which embodiments of the present disclosure may be implemented.

Referring to FIG. 2, the VR engine 102 may include a processor 202, a memory 204, interface(s) 206, and a database 208. In some embodiments, the processor 202 may include suitable logic, circuitry, and interfaces that may be configured to execute program instructions associated with different operations to be executed by the VR engine 102. For example, some of the operations may include, but are not limited to, receiving a set of user inputs, creating a customized virtual reality environment (e.g., 114), and rendering the created customized virtual reality environment 114 on a VR terminal (e.g., 106A).

In some embodiments, the processor 202 may be implemented as one or more microprocessors, microcomputers, microcontrollers, edge or fog microcontrollers, digital signal processors, central processing units, logic circuitries, and/or any devices that process data based on operational instructions. Among other capabilities, the processor 202 may be configured to fetch and execute computer-readable instructions stored in the memory 204 of the VR engine 102. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as Random-Access Memory (RAM), or non-volatile memory such as Electrically Erasable Programmable Read-only Memory (EPROM), flash memory, and the like.

In some embodiments, the VR engine 102 may include the interface(s) 206. The interface(s) 206 may comprise a variety of interfaces, for example, interfaces for data input and output devices, referred to as input/output (I/O) devices, storage devices, and the like. The interface(s) 206 may facilitate communication for the VR engine 102. The interface(s) 206 may also provide a communication pathway for one or more components of the VR engine 102. Examples of such components include, but are not limited to, the database 208. In some embodiments, the database 208 may comprise data that may be either stored or generated as a result of functionalities implemented by any of the components of the VR engine 102.

In some embodiments, the interface(s) 206 may include suitable logic, circuitry, and interfaces that may be configured to facilitate a communication between the processor 202, a set of user devices (e.g., 104), and/or a server (e.g., 108) via a communication network 110. The interface(s) 206 may be implemented by use of various known technologies to support wired or wireless communication of the VR engine 102 with the communication network 110. The interface 206 may include, for example, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

In some embodiments, the functions and/or operations executed by the VR engine 102, as described in FIG. 1, may be performed by the processor 202.

It may be appreciated that the block diagram 200 may be modular and flexible to accommodate any kind of changes in the VR engine 102.

Figure 3:
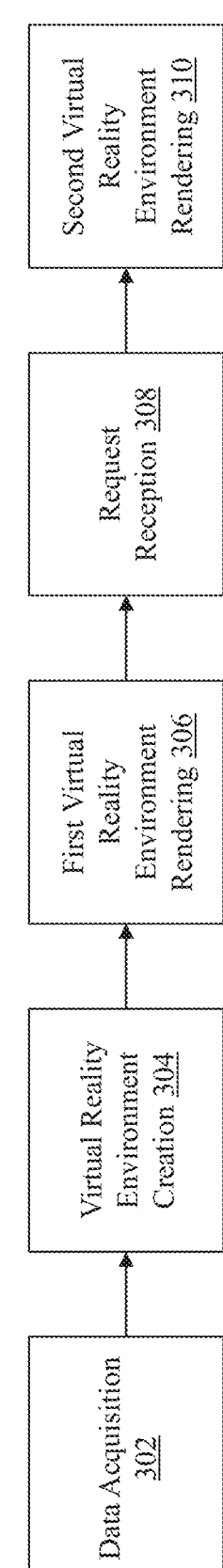
FIG. 3 shows an example flow diagram for implementing operations for creating a customized virtual reality environment, in accordance with embodiments of the present disclosure.

FIG. 3 shows an example flow diagram 300 for implementing operations for creating a customized virtual reality environment, in accordance with embodiments of the present disclosure. The example operations illustrated in the flow diagram 300 may start at block 302 and may be performed by any computing system, apparatus, or device, such as by the VR engine 102 of FIG. 1 or the processor 202 of FIG. 2. Although illustrated with discrete blocks, the example operations associated with one or more blocks of the flow diagram 300 may be divided into additional blocks, combined into fewer blocks, or eliminated, depending on the particular implementation.

Referring to FIG. 3, at block 302, a data acquisition operation may be performed. In the data acquisition operation, the processor 202 may be configured to receive information associated with one or more physiological parameters associated with at least one of a set of users (e.g., 112). The one or more physiological parameters may include, but not be limited to, a pulse rate, a heart rate, a blood oxygen level, a blood pressure, a body temperature, and the like. The information associated with the one or more physiological parameters may be received from one or more sensors that may be worn by the set of users 112. In some embodiments, the one or more sensors may be present on the VR terminal 118 or other devices associated with the user, such as but not limited to a mobile device, a smart watch, or any other wearable device. In some embodiments, the received information may be indicative of an increased stress level of at least one of the set of users 112. In another embodiment, the processor 202 may be further configured to receive data associated with one or more electro-dermal activity of at least one of the set of users 112. The received data may include, but not limited to, skin and sweat responses.

In some embodiments, information associated with the one or more physiological parameters of the user as received by the VR engine 102 may be processed by the VR engine 102 to recommend a virtual reality environment or customization options associated with the VR environment to the user. In some examples, the VR engine 102 may be an artificial intelligence (AI)-enabled engine. In some examples, the AI-enabled engine may comprise a trained machine learning model. Moreover, in some examples, the machine learning model may comprise a neural network, and the like. The VR engine 102 may employ AI functionality to process information associated with the user 112 or set of users 112, such as physiological parameters, user history, user behavior, or the like associated with the user 112 or the set of users 112 to adapt VR rendering. For example, the VR engine 102 may employ the AI functionality to generate customized VR environments, which are determined to reduce stress levels of the users.

In some embodiments, the VR engine may receive data indicative of the one or more physiological parameters of the user in real time as the user is experience the VR environment. For example, the one or more physiological parameters may be obtained from one or more sensors present in the VR terminal or any other wearable device worn by the user. In such embodiments, the physiological parameters data may be processed in real time by the VR engine, for example, by employing the AI functionality, and based on processing, the virtual reality environment may be modified or adapted in real-time, for example, for the enhanced stress relief for the user experiencing it. In some embodiments, the modification or adaptation of the virtual reality environment may occur after obtaining user permission. The modification or adaption of the virtual reality environment may correspond to audio or video rendered within the virtual reality environment.

To reduce the increased stress level, at least one user (i.e., first user 112A) from the set of users 112 may wish to watch a customized virtual reality environment (e.g., 114). To create the customized virtual reality environment 114, the processor 202 may be configured to receive a set of user inputs from at least the first user device 104A. The set of user inputs may include a first user input and a second user input. The first user input may be associated with a selection of a virtual reality environment 114 from a set of virtual reality environments. In an embodiment, each of the plurality of virtual reality environments may be rendered on the first VR terminal 106A. The first user 112A may select the virtual reality environment 114 from the set of virtual reality environments, which they may wish to customize and view.

The second user input may be associated with a set of customization options for the selected virtual reality environment 114. The set of user inputs may be received from a first user device 104A that may be associated with the first user 112A.

In some embodiments, the set of customization options may include, but are not limited to, a scene type of the virtual reality environment 114, a weather within the virtual reality environment 114, a timestamp associated with the virtual reality environment 114, and a media to be rendered within the virtual reality environment 114. The scene type may include a type of scene in the virtual reality environment 114. The scene may be a digital environment that may be created for the purpose of immersing a user 112 in a simulated space. Examples of different types of scenes may include, but not limited to, a beach scene, a hiking scene, a deep-water scene, a snow capped mountain scene, a sunrise scene, a sunset scene, a wildlife scene, and the like. The weather within the virtual reality environment 114 may correspond to a state of the atmosphere at the virtual reality environment 114 in regard to temperature, humidity, wind, sunshine, precipitation, and other meteorological elements. Examples of different types of weather may include, but are not limited to, a sunny weather, a cloudy weather, a rainy weather, a snowy weather, a stormy weather, a windy weather, a foggy weather, and the like. w to be rendered within the virtual reality environment 114 may include an audio that may be rendered within the virtual reality environment 114. In an embodiment, the audio may be of a pre-determined frequency. The pre-determined frequency may be a frequency that is determined to reduce stress levels within the user.

Figure 4:
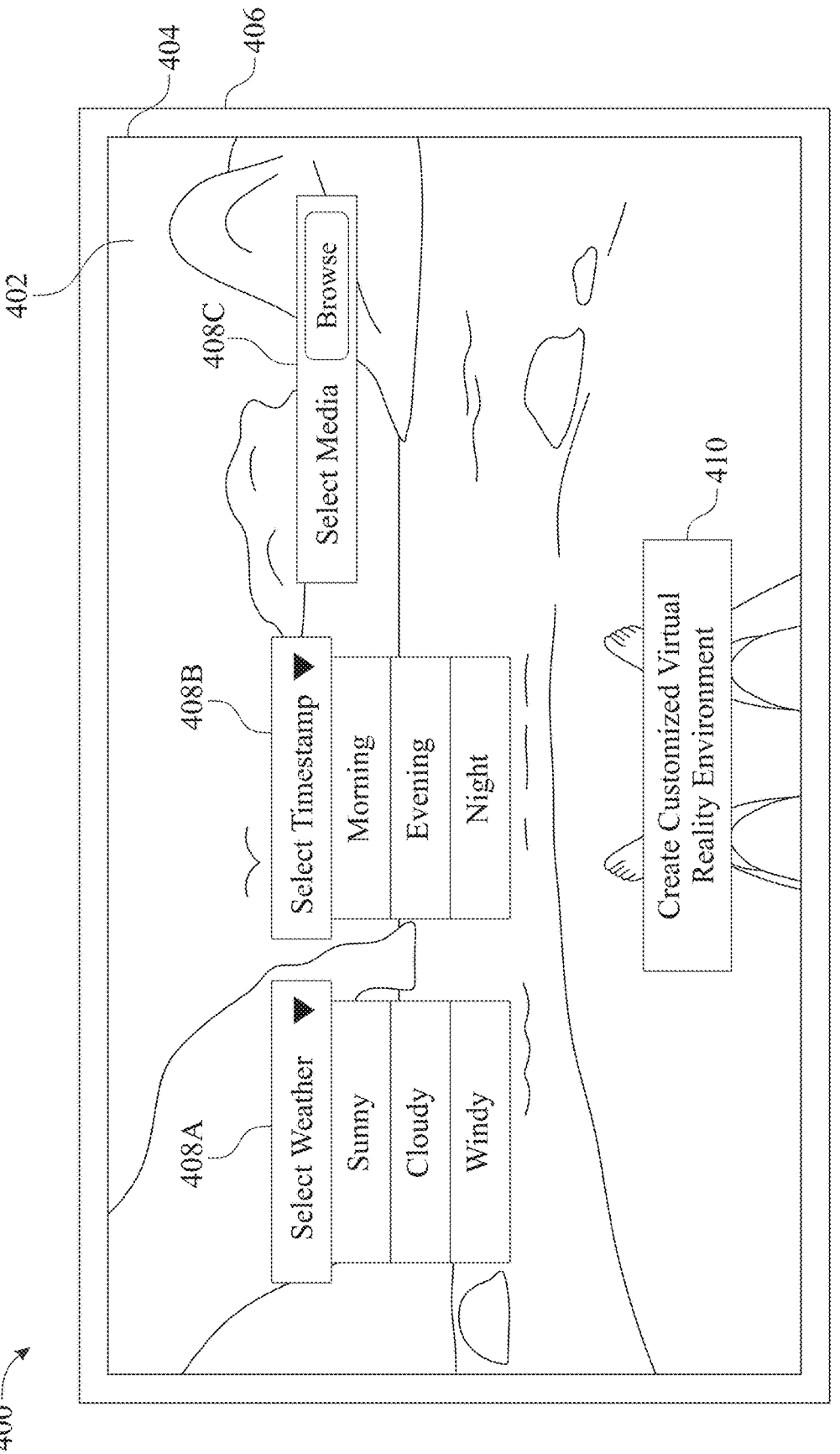
FIG. 4 shows an example user interface (UI) for providing user input for creating customized virtual reality environment, in accordance with embodiments of the present disclosure.

In some embodiments, the processor 202 may be configured to receive the set of user inputs from one or more user interface (UI) elements that may be rendered as a menu on the first user device 104A, as shown in FIG. 4. Alternatively, the menu may be rendered on a first VR terminal 106A. Specifically, the processor 202 may be configured to receive the set of user inputs based on a selection of the one or more UI elements.

Referring to FIG. 3 at block 304, a virtual reality environment creation operation may be performed. In the virtual reality environment creation operation, the processor 202 may be configured to create the customized virtual reality environment 114. The customized virtual reality environment 114 may be created based on the received set of user inputs that may be associated with the customization of the virtual reality environment 114. The customized virtual reality environment 114 may be a computer-generated simulation of a 3D environment that may allow the set of users 112 to feel as if they are physically present in that environment. In some embodiments, the customized virtual reality environment 114 may include a first avatar (e.g., 116A) that may be associated with the first user 112A. The first avatar 116A may correspond to a virtual representation of the first user 112A in the customized virtual reality environment 114.

At block 306, a first virtual reality environment rendering operation may be performed. In the first virtual reality environment rendering operation, the processor 202 may be configured to render the created customized virtual reality environment 114 on the first VR terminal 106A to be viewed by the first user 112A. The customized virtual reality environment 114 may be rendered on the first VR terminal 106A that may be associated with the first user device 104A or the first user 112A.

At block 308, a request reception operation may be performed. In the request reception operation, the processor 202 may be configured to receive a request to join the created customized virtual reality environment 114. The request may be received from a second user device 104B associated with a second user 112B. In some embodiments, the second user 112B may wish to join the customized virtual reality environment 114 created based on the set of user inputs. The second user 112B may thus transmit the request to join the created customized virtual reality environment 114. In an alternate embodiment, the first user 112A may invite the second user 112B to join the customized virtual reality environment 114.

At block 310, a second virtual reality environment rendering operation may be performed. In the second virtual reality environment rendering operation, the processor 202 may be configured to render the customized virtual reality environment 114 on a second VR terminal 106B to be viewed by the second user 112B along with the first user 112A. The customized virtual reality environment 114 may be rendered on the second VR terminal 106B that may be associated with the second user device 104B or the second user 112B. In some embodiments, the created customized virtual reality environment 114 may include a second avatar 116B that may be associated with the second user 112B. The second avatar 116B may correspond to a virtual representation of the second user 112B in the customized virtual reality environment 114.

In some embodiments, the first user 112A and the second user 112B may communicate with each other within the customized virtual reality environment 114. The first user 112A and the second user 112B may communicate with each other within the customized virtual reality environment 114 using the first avatar 116A associated with the first user 112A and a second avatar associated with the second user 112B. In some embodiments, the communication between the first user 112A and the second user 112B in the customized virtual reality environment 114 may be deemed as similar to the communication between the first user 112A and the second user 112B in a real world. In some embodiments, the increased stress level of the first user 112A and/or the second user 112B may be reduced after viewing the customized virtual reality environment 114 and communicating with each other within the customized virtual reality environment 114.

In some embodiments, the customized virtual reality environment 114 may be rendered on the first VR terminal 106A and the second VR terminal 106B for a pre-determined time period that may be controllable by an administrator of the VR engine 102. In another embodiment, the first user 112A and/or the second user 112B may be able to provide the set of user inputs while the customized virtual reality environment 114 is being rendered on the first VR terminal 106A and/or the second VR terminal 106B to update the customized virtual reality environment 114. Based on the reception of the set of user inputs, the processor 202 may be able to dynamically update the customized virtual reality environment 114.

In some embodiments, the processor 202 may be configured to allow the end user 112 to enjoy the customized virtual reality environment 114 alone, or to join public or private groups with others in any of other virtual reality environments. Any user 112 in communication with the VR engine 102 may be able connect to a group over the communication network 110.

Therefore, the disclosed VR engine 102 may provide a customizable virtual reality environment that may be accessed via a VR terminal 106, for example, a virtual reality headset and its related controllers. The VR engine 102 may further allow the user 112 to visit a variety of beautiful, peaceful customized virtual reality environments 114 that may be designed to reduce stress and calm the user 112. Such customized virtual reality environments 114 may be experienced alone, or accompanied by friends or family who may be invited by the user 112. The VR engine 102 may also allow the user 112 to specifically tailor their experience in these customized virtual reality environments 114.

In some embodiments, the disclosed VR engine 102 may provide six separate virtual reality environments available to the user 112 for selection and customization. Each virtual reality environment created by the VR engine 102 may allow the user 112 to customize the overall experience. The VR engine 102 may further enable the user 112 to access a menu of options for the virtual reality environment via a controller for a virtual reality headset. This menu may allow the user 112 to choose a set of customizable options for the virtual reality environments such as, music for the virtual reality environment, weather in the virtual reality environment, time of day in which the virtual reality environment is experienced, and other features. In this way, the controller for the virtual reality headset may allow the user 112 to customize the virtual reality environment to fit the user's particular preferences.

FIG. 4 shows an example user interface (UI) 400 for providing a user input for creating a customized virtual reality environment, in accordance with embodiments of the present disclosure.

With reference to FIG. 4, there is shown an example UI 400. The UI includes a virtual reality environment 402 that may be selected by a user device 406 associated with a user by way of a first user input and may be rendered on a display screen 404. In some embodiments, the display screen 404 may be associated with a VR terminal. There is further shown a first UI element 408A, a second UI element 408B, a third UI element 408C, and a fourth UI element 410.

In an embodiment, the user may be able to provide a second user input associated with a set of customization options for the selected virtual reality environment 402 via the first UI element 408A, the second UI element 408B, and the third UI element 408C. Specifically, each of the first UI element 408A, the second UI element 408B, and the third UI element 408C may correspond to a drop down menu option. The first UI element 408A may be used to select a weather within the virtual reality environment 402. The second UI element 408B may be used to select a timestamp associated with the virtual reality environment 402. The third UI element 408C may be used to select a media to be rendered within the virtual reality environment 402. In some embodiments, the fourth UI element 410 may be a button. The VR engine 102 may be configured to create the customized virtual reality environment 402 based on a selection of the fourth UI element 410 by the user.

Figure 5:
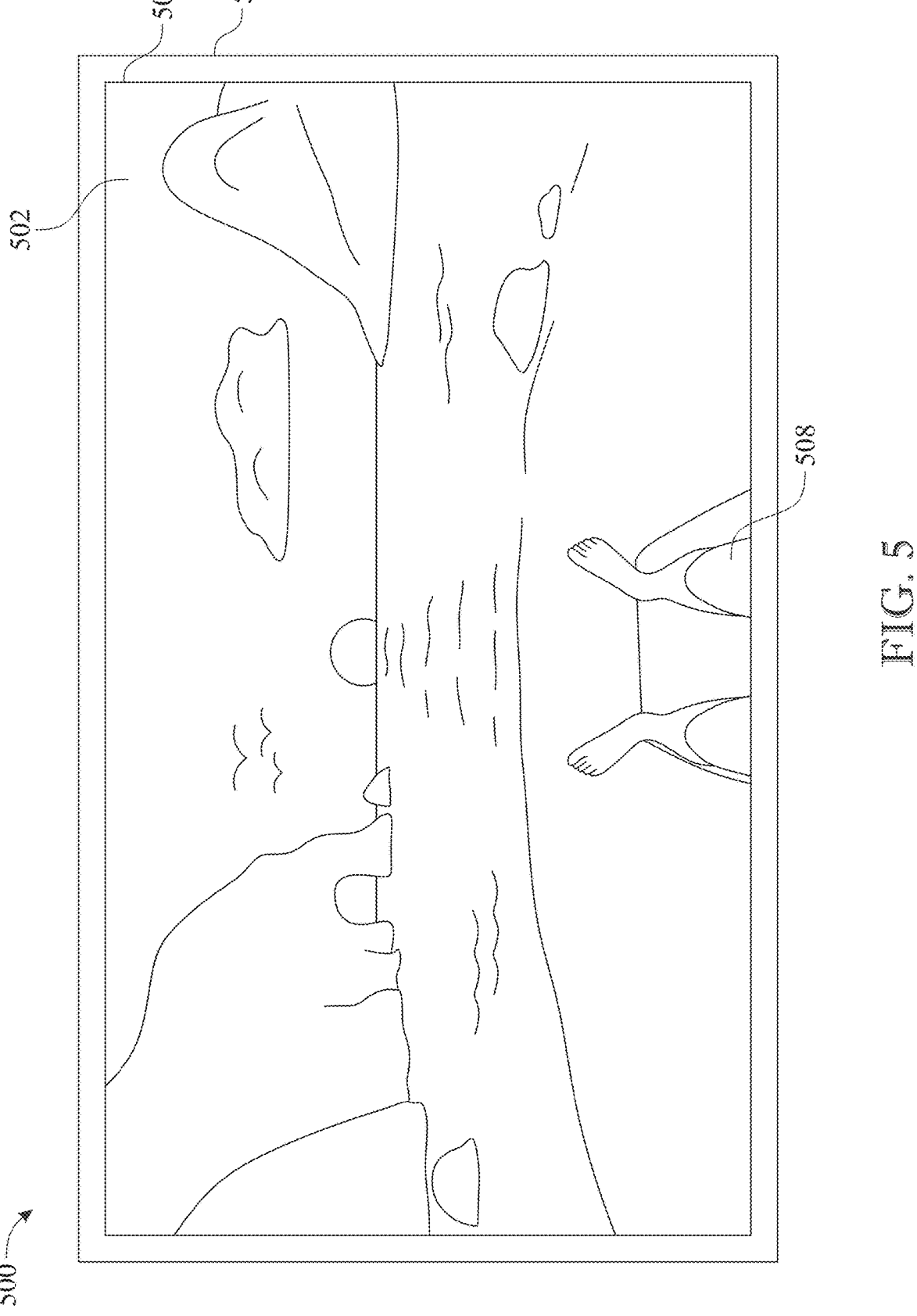
FIG. 5 shows an example representation of a customized virtual reality environment, in accordance with embodiments of the present disclosure.

FIG. 5 shows an example representation 500 of a customized virtual reality environment, in accordance with embodiments of the present disclosure.

With reference to FIG. 5, there is shown an example representation 500 of a customized virtual reality environment 502 of a beach that may be rendered on a display screen 504 of a VR terminal 506. The customized virtual reality environment 502 may be an example embodiment of the customized virtual reality environment 114 of FIG. 1. The VR terminal 506 may be an example embodiment of the first VR terminal 106A of FIG. 1. With reference to FIG. 5, there is further shown an avatar 508 associated with a user of the VR terminal 506.

In some embodiments, the disclosed VR engine 102 may be configured to receive a first user input associated with a selection of a virtual reality environment 502 from a set of virtual reality environments. The disclosed VR engine 102 may be further configured to receive a second user input associated with a set of customization options of the selected virtual reality environment 502. The set of user inputs may be received from a user device associated with the user or via the VR terminal 506. The set of customization options may include at least one of a weather within the virtual reality environment 502, a timestamp associated with the virtual reality environment 502, and a media to be rendered within the virtual reality environment 502. In some embodiments, the selected virtual reality environment may be of a "beach scene." The weather to be associated with the virtual reality environment 502 may be selected as "cloudy," and the timestamp associated with the virtual reality environment 502 may be selected as "morning." The VR engine 102 may be further configured to create the customized virtual reality environment 502, which may render the beach scene on a cloudy morning. The VR engine 102 may further render the customized virtual reality environment 502 on the display screen 504 of the VR terminal 506.

FIG. 6 shows a flow chart of an example method 600 for creating a customized virtual reality environment, in accordance with embodiments of the present disclosure. The blocks from 602 to 608 may be implemented by any computing system, such as by the VR engine 102 of FIG. 1 or FIG. 2.

At block 602, a first user input may be received from a user device 104. The first user input may be associated with a selection of a virtual reality environment 114 from a set of virtual reality environments. The user device 104 may be associated with a user 112.

At 604, a second user input may be received from the user device 104 based on the received first user input. The second user input may be associated with a set of customization options for the selected virtual reality environment 114. The set of customization options may include, but not be limited to, a weather within the virtual reality environment 114, a timestamp associated with the virtual reality environment 114, and a media to be rendered within the virtual reality environment 114.

At block 606, the customized virtual reality environment 114 may be generated based on the received second user input associated with the set of customization options for the virtual reality environment 114.

At block 608, the generated customized virtual reality environment 114 may be rendered on a VR terminal 106 associated with the user device 104 or the user 112.

It will be appreciated that the blocks shown in FIG. 6 are merely illustrative. Other suitable steps may be used for the same, if desired. Moreover, the blocks of the method 600 may be performed in any order and may include additional steps.

FIG. 7 shows a flow chart of an example method 700 for creating a customized virtual reality environment and interacting within the customized virtual reality environment, in accordance with embodiments of the present disclosure. The blocks from 702 to 712 may be implemented by any computing system, such as by the VR engine 102 of FIG. 1 or FIG. 2.

At block 702, a first user input may be received from a first user device 104A. The first user input may be associated with a selection of a virtual reality environment 114 from a set of virtual reality environments. The first user device 104A may be associated with a first user 112A.

At block 704, a second user input may be received from the first user device 104A based on the received first user input. The second user input may be associated with a set of customization options for the selected virtual reality environment 114. The set of customization options may include, but not be limited to, a weather within the virtual reality environment 114, a timestamp associated with the virtual reality environment 114, and a media to be rendered within the virtual reality environment 114.

At block 706, the customized virtual reality environment 114 may be generated based on the received second user input associated with the set of customization options for the virtual reality environment 114.

At block 708, the generated customized virtual reality environment 114 may be rendered on a first VR terminal 106A associated with the first user device 104A. The generated virtual reality environment 114 may be rendered to be viewed by the first user 112A.

At block 710, a request to join the generated virtual reality environment 114 may be received from a second user device 104B associated with a second user 112B.

At block 712, the generated virtual reality environment 114 may be rendered on a second VR terminal 106B associated with the second user device 104B. The generated virtual reality environment 114 may be rendered to be viewed by the second user 112B. The first user 112A and the second user 112B may communicate with each other within the virtual reality environment 114 using a first avatar 116A associated with the first user 112A and a second avatar 116B associated with the second user 112B. In an embodiment, the stress level of each of the first user 112A and the second user 112B may be reduced after viewing the customized virtual reality environment 114.

It will be appreciated that the blocks shown in FIG. 7 are merely illustrative. Other suitable steps may be used for the same, if desired. Moreover, the blocks of the method 700 may be performed in any order and may include additional steps.

Figure 8:
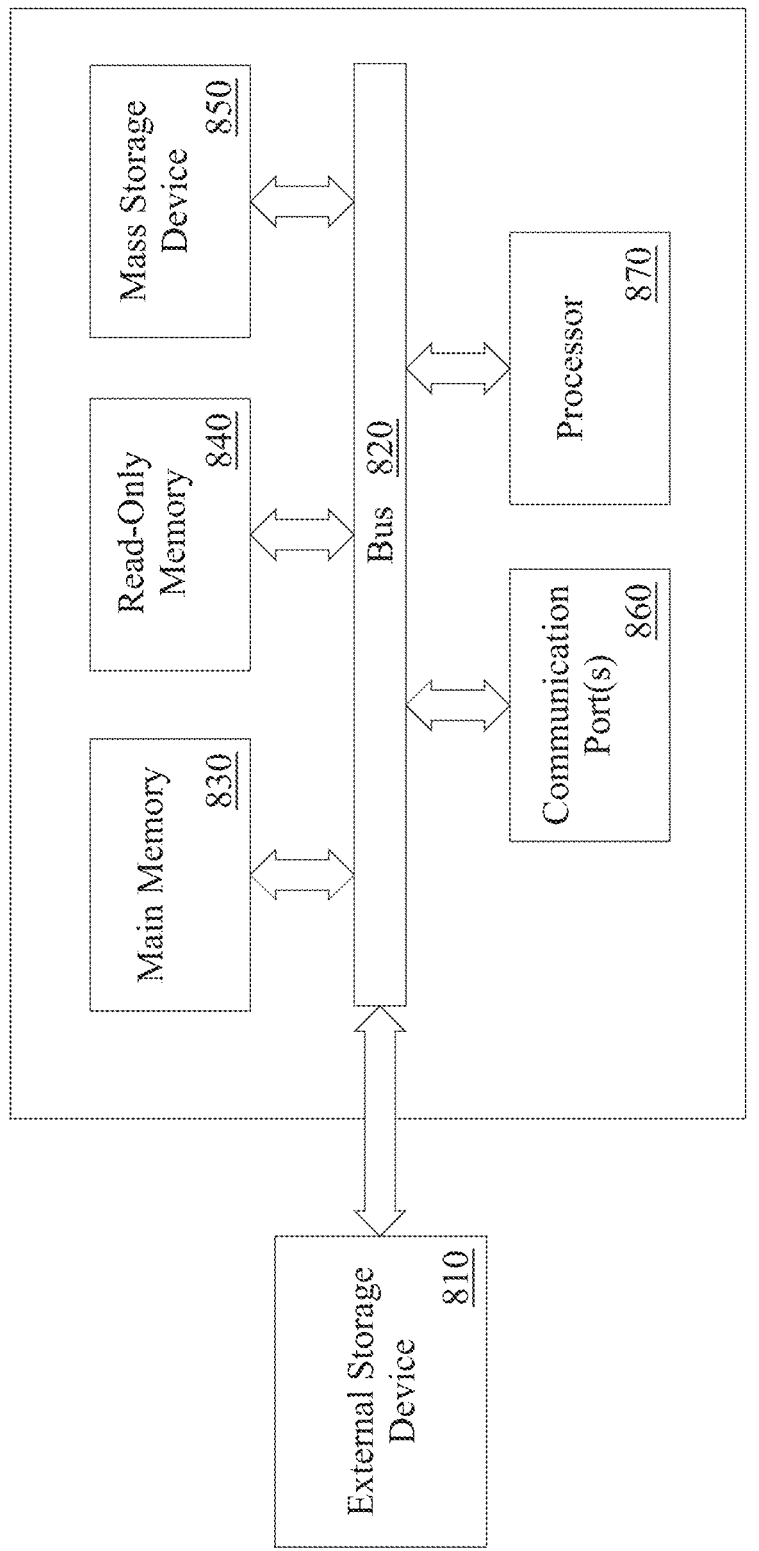
FIG. 8 illustrates an exemplary computer system in which or with which embodiments of the present disclosure may be implemented.

FIG. 8 illustrates an exemplary computer system 800 in which or with which embodiments of the present disclosure may be implemented. In some embodiments, the VR engine 102 of FIG. 1 may be implemented as the computer system 800. Alternatively, or additionally, each of the set of user devices 104 of FIG. 1 may also be implemented as the computer system 800.

As shown in FIG. 8, the computer system 800 may include an external storage device 810, a bus 820, a main memory 830, a read-only memory 840, a mass storage device 850, communication port(s) 860, and a processor 870. A person skilled in the art will appreciate that the computer system 800 may include more than one processor and communication ports. The processor 870 may include various modules associated with embodiments of the present disclosure. The communication port(s) 860 may be chosen depending on a network, such a Local Area Network (LAN), Wide Area Network (WAN), or any network to which the computer system 800 connects. The main memory 830 may be Random-Access Memory (RAM), or any other dynamic storage device commonly known in the art. The read-only memory 840 may be any static storage device(s) e.g., but not limited to, a Programmable Read Only Memory (PROM) chips for storing static information e.g., start-up or BIOS instructions for the processor 870. The mass storage device 850 may be any current or future mass storage solution, which can be used to store information and/or instructions.

The bus 820 communicatively couples the processor 870 with the other memory, storage, and communication blocks. Optionally, operator and administrative interfaces, e.g. a display, keyboard, joystick, and a cursor control device, may also be coupled to the bus 820 to support direct operator interaction with the computer system 800. Other operator and administrative interfaces can be provided through network connections connected through communication port(s) 860. The external storage device 810 may be any kind of external hard-drives, floppy drives, or the like. Components described above are meant only to exemplify various possibilities. In no way should the aforementioned exemplary computer system 800 limit the scope of the present disclosure.

The present disclosure provides technological solution of enabling each user to customize virtual reality environments according to their respective preferences, which may be based on stress reducing stimuli that may be different for each user. Each user may have a different response to a different virtual reality environment. For example, the first user may experience reduced stress levels when the first user experiences a virtual reality environment comprising a morning scene of a snow-capped mountain scene in a windy weather. However, the second user may experience reduced stress levels when the second user experiences a virtual reality environment comprising an evening scene of a beach in a sunny weather. In other words, one user may choose a first set of customization options for the virtual reality environment, which works for the first user to reduce stress in the user; and another user may choose another set of customization options for the virtual reality environment, which works for other user in reducing stress. Moreover, the present disclosure provides for a technological solution where the systems and methods disclosed herein provides generating and recommending customization options for the virtual reality environment for different users based on respective one or more physiological parameters of the users. Furthermore, the methods and systems of the present disclosure employ AI functionality to process information associated with the user such as physiological parameters, user history, user behavior, or the like associated with the user to adapt VR rendering, for example to generate user-specific customized VR environments, which are predicted or determined to reduce the stress level of that specific user.

The methods described herein may be performed using the systems described herein. In addition, it is contemplated that the methods described herein may be performed using systems different than the systems described herein. Moreover, the systems described herein may perform the methods described herein and may perform or execute instructions stored in a non-transitory computer-readable storage medium (CRSM). The CRSM may comprise any electronic, magnetic, optical, or other physical storage device that stores executable instructions. The instructions may comprise instructions to cause a processor to perform or control performance of operations of the proposed methods. It is also contemplated that the systems described herein may perform functions or execute instructions other than those described in relation to the methods and CRSMs described herein.

Furthermore, the CRSMs described herein may store instructions corresponding to the methods described herein and may store instructions which may be performed or executed by the systems described herein. Furthermore, it is contemplated that the CRSMs described herein may store instructions different than those corresponding to the methods described herein and may store instructions which may be performed by systems other than the systems described herein.

The methods, systems, and CRSMs described herein may include the features or perform the functions described herein in association with any one or more of the other methods, systems, and CRSMs described herein.

In some embodiments the method or methods described above may be executed or carried out by a computing system (for example, the computer system 800 of FIG. 8) including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A computer-implemented method, comprising:

receiving, by a virtual reality engine, from a first user device associated with a first user, a first user input associated with selection of a virtual reality environment from a set of virtual reality environments;

receiving, by the virtual reality engine, from the first user device, a second user input associated with a set of customization options for the selected virtual reality environment, wherein the set of customization options comprises at least one of: a weather within the virtual reality environment, a timestamp associated with the virtual reality environment, and a media to be rendered within the virtual reality environment;

generating, by the virtual reality engine, a customized virtual reality environment based on the second user input;

rendering, by the virtual reality engine, on a virtual reality terminal associated with the first user, the customized virtual reality environment;

receiving, by the virtual reality engine, from a second user device associated with a second user, a request to join the customized virtual reality environment;

in response to the request, rendering, by the virtual reality engine, on a virtual reality terminal associated with the second user, the customized virtual reality environment; and enabling, by the virtual reality engine, the first user and the second user to communicate with each other within the customized virtual reality environment using a first avatar and a second avatar, the first avatar being associated with the first user, and the second avatar being associated with the second user.

2. The method of claim 1, further comprising:

receiving, by the virtual reality engine, data indicative of one or more physiological parameters of the first user;

processing, by the virtual reality engine, the data indicative of the one or more physiological parameters of the first user; and generating, by the virtual reality engine, based on processing, one or more virtual reality environment customization recommendations for the first user.

3. The method of claim 1, wherein the virtual reality engine is an artificial intelligence (AI)-enabled engine, the method further comprising:

employing, by the virtual reality engine, AI functionality to process user information, wherein the user information comprises one or more of physiological parameters of the first user, user history of the first user, and user behavior of the first user, and wherein the customized virtual reality environment is further generated and rendered based on the processed user information.

4. The method of claim 1, wherein receiving the second user input comprises receiving a user input indicative of user-selected weather for the selected virtual reality environment.

5. The method of claim 1, wherein receiving the second user input comprises receiving a user input indicative of user-selected time of day for the selected virtual reality environment.

6. The method of claim 1, wherein receiving the second user input comprises receiving a user input indicative of user-selected audio media for the selected virtual reality environment.

7. The method of claim 1, wherein receiving the second user input comprises receiving a set of user inputs, the set of user inputs comprising a selection of weather, a selection of a time of day, and a selection of audio media, for the selected virtual reality environment, the weather being selected from a sunny weather, a cloudy weather, a rainy weather, a snowy weather, a stormy weather, a windy weather, and a foggy weather, and the time of day being selected from morning, afternoon, evening, and night.

8. A virtual reality engine, comprising:

a processor; and a memory coupled to the processor, the memory comprises processor-executable instructions, which when executed by the processor, cause the processor to perform or control performance of operations that comprise:

receive, from a first user device associated with a first user, a first user input associated with selection of a virtual reality environment from a set of virtual reality environments;

receive, from the first user device, a second user input associated with a set of customization options for the selected virtual reality environment, wherein the set of customization options comprises at least one of: a weather within the virtual reality environment, a timestamp associated with the virtual reality environment, and a media to be rendered within the virtual reality environment;

generate a customized virtual reality environment based on the second user input;

render, on a virtual reality terminal associated with the first user, the customized virtual reality environment;

receive, from a second user device associated with a second user, a request to join the customized virtual reality environment;

in response to the request, render, on a virtual reality terminal associated with the second user, the customized virtual reality environment; and enable the first user and the second user to communicate with each other within the customized virtual reality environment using a first avatar and a second avatar, the first avatar being associated with the first user, and the second avatar being associated with the second user.

9. The virtual reality engine of claim 8, wherein the operations further comprise:

receive data indicative of one or more physiological parameters of the first user;

process the data indicative of the one or more physiological parameters of the first user; and generate, based on processing, one or more virtual reality environment customization recommendations for the first user.

10. The virtual reality engine of claim 8, wherein the virtual reality engine is an artificial intelligence (AI)-enabled engine, the operations further comprising:

employ AI functionality to process user information, wherein the user information comprises one or more of physiological parameters of the first user, user history of the first user, and user behavior of the first user, and wherein the customized virtual reality environment is further generated and rendered based on the processed user information.

11. The virtual reality engine of claim 8, wherein the second user input comprises a user input indicative of user-selected weather for the selected virtual reality environment.

12. The virtual reality engine of claim 8, wherein the second user input comprises a user input indicative of user-selected time of day for the selected virtual reality environment.

13. The virtual reality engine of claim 8, wherein the second user input comprises a user input indicative of user-selected audio media for the selected virtual reality environment.

14. The virtual reality engine of claim 8, wherein the second user input comprises a set of user inputs, the set of user inputs comprising a selection of weather, a selection of a time of day, and a selection of audio media, for the selected virtual reality environment, the weather being selected from a sunny weather, a cloudy weather, a rainy weather, a snowy weather, a stormy weather, a windy weather, and a foggy weather, and the time of day being selected from morning, afternoon, evening, and night.

15. A non-transitory computer-readable storage medium comprising instructions executable by a processor, the instructions to cause the processor to perform or control performance of operations that comprise:

receive, from a first user device associated with a first user, a first user input associated with selection of a virtual reality environment from a set of virtual reality environments;

receive, from the first user device, a second user input associated with a set of customization options for the selected virtual reality environment, wherein the set of customization options comprises at least one of: a weather within the virtual reality environment, a time-stamp associated with the virtual reality environment, and a media to be rendered within the virtual reality environment;

generate a customized virtual reality environment based on the second user input;

render, on a virtual reality terminal associated with the first user, the customized virtual reality environment;

receive, from a second user device associated with a second user, a request to join the customized virtual reality environment;

in response to the request, render, on a virtual reality terminal associated with the second user, the customized virtual reality environment; and enable the first user and the second user to communicate with each other within the customized virtual reality environment using a first avatar and a second avatar, the first avatar being associated with the first user, and the second avatar being associated with the second user.

* * * * *